(12) United States Patent
Bradley et al.

(10) Patent No.: US 10,302,887 B1
(45) Date of Patent: May 28, 2019

(54) OPTICAL CORD RETAINING DEVICE

(71) Applicant: OFS Fitel, LLC, Norcross, GA (US)

(72) Inventors: Kelvin B Bradley, Lawrenceville, GA (US); Denis E Burek, Cumming, GA (US); John E George, Cumming, GA (US); Willard C White, Suwanee, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/942,489

(22) Filed: Mar. 31, 2018

Related U.S. Application Data

(60) Provisional application No. 62/596,997, filed on Dec. 11, 2017.

(51) Int. Cl.
G02B 6/44 (2006.01)

(52) U.S. Cl.
CPC ......... *G02B 6/4466* (2013.01); *G02B 6/4478* (2013.01); *B65H 2701/32* (2013.01)

(58) Field of Classification Search
CPC .. G02B 6/4463; G02B 6/4466; G02B 6/4478; B65H 2701/32
USPC ................................ 385/134, 136, 137, 147
See application file for complete search history.

(56) References Cited

U.S. PATENT DOCUMENTS

| 8,792,766 | B2 * | 7/2014 | Hendrickson | B65H 49/205 |
| | | | | 385/135 |
| 9,059,578 | B2 * | 6/2015 | Sokolowski | G02B 6/4471 |
| 9,720,200 | B2 | 8/2017 | Lu et al. | |
| 2008/0011990 | A1 * | 1/2008 | Kostet | G02B 6/4457 |
| | | | | 254/134 |
| 2009/0294016 | A1 * | 12/2009 | Sayres | B29C 47/0023 |
| | | | | 156/71 |
| 2009/0324188 | A1 * | 12/2009 | Berglund | G02B 6/4441 |
| | | | | 385/135 |
| 2011/0030190 | A1 * | 2/2011 | Larson | G02B 6/4441 |
| | | | | 29/428 |
| 2013/0020015 | A1 * | 1/2013 | Dickinson | B65H 49/205 |
| | | | | 156/166 |
| 2013/0098557 | A1 * | 4/2013 | Takeuchi | B65H 35/004 |
| | | | | 156/349 |

(Continued)

OTHER PUBLICATIONS

OFS Fitel, LLC, InvisiLight(r) Drop Solution, Jun. 2016, two-page brochure.

(Continued)

*Primary Examiner* — Robert Tavlykaev
(74) *Attorney, Agent, or Firm* — Law Office of Leo Zucker

(57) ABSTRACT

A device for retaining an optical fiber or cord at a desired position while the cord is being installed along a defined route at a user premises. The device includes a bend limiter having an open channel that extends between opposite ends of the limiter, wherein the channel is sized to receive a cord and allow the cord to slide freely inside the channel. An elongated retainer is arranged to overlie the bend limiter and thus close the channel when the retainer is secured to the bend limiter, so that the cord is confined inside the channel as the cord slides between the opposite ends of the bend limiter. A latch is arranged to close the device by securing the retainer to the bend limiter, and the bend limiter is configured to conform in shape with one or more surfaces against which it will be installed at the premises.

13 Claims, 7 Drawing Sheets

(56) References Cited

U.S. PATENT DOCUMENTS

Figure 1:
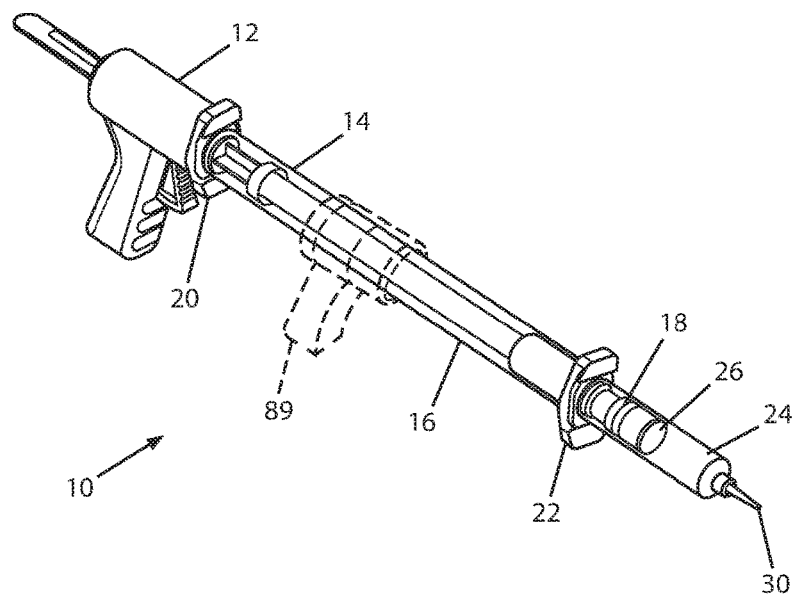

2013/0294734 A1* 11/2013 Takeuchi ............. G02B 6/4401
 385/100
2017/0160508 A1 6/2017 Burek et al.
2017/0336589 A1* 11/2017 Marcou ................ G02B 6/4471

OTHER PUBLICATIONS

OFS Fitel, LLC, EZ-Bend(r) InvisiLight(r) In-Living Unit Solution, Installation Instructions with InvisiLight Drop Preparation, Jun. 2016 (13 pages).

* cited by examiner

OPTICAL CORD RETAINING DEVICE

CROSS REFERENCE TO RELATED APPLICATION

This application claims priority under 35 U.S.C. § 119(e) of United States Provisional Patent Application No. 62/596,997 filed Dec. 11, 2017, titled "Cord Retaining Device," the entire contents of which are incorporated herein by reference.

BACKGROUND OF THE INVENTION

Field of the Invention

The present invention relates to devices and tools for installing an optical fiber inside a living unit or premises of a fiber optic network user, and particularly to a device that retains the fiber at a desired position while the fiber is installed at the premises.

Discussion of the Known Art

As used herein, the term "premises" is intended to mean a home, an office, an apartment, or other living unit where a user of a fiber optic network resides and uses services provided by the network, e.g., Internet access, telephony, television, voice and music broadcasts, and/or other information and data streams that require the routing and installation of one or more optical fibers inside the premises. Moreover, the terms "fiber," "optical fiber," and "cord" are used interchangeably herein and are intended to mean an optical fiber that is buffered and/or jacketed, as well as a fiber optic cable that contains one or more optical fibers.

Desktop optical network terminals (ONTs) are being deployed at an increasing rate inside premises of fiber optic network users. ONTs are usually placed on a desk or shelf inside a user's premises, near a TV set top box, cable modem, or other electronic device to which the ONT will be connected to interface the device with the network. A need presently exists for a tool or device for installing an optical fiber between the ONT, and a network provider terminal that is typically located at or near an entry point of the premises, wherein the device can install the fiber quickly, securely, and reliably over an elevated routing path at the premises and without an adverse visual impact when the installation is complete.

Conventional staples can be used to secure a fiber to a wall, a wall molding, or other exposed and accessible structural surface at a premises so as to, minimize installation time and incur a relatively low cost. Stapled installations are rejected, however, by many users who opt instead for special moldings or conduits to conceal the fiber at their premises. Staples can also physically damage walls and moldings, and impair or break a fiber if they are not properly installed. Some users also prefer to hide all wires and fibers completely at their premises, thereby incurring expensive hardware and increased installation time.

Accordingly, a system that enables an installer to route and bond an optical fiber quickly, properly, and safely along structural surfaces, grooves, and/or corners inside user premises with little if any visibility, is very desirable. A solution offered by OFS Fitel, LLC under the registered mark InvisiLight® fulfills this need by providing fast, easy, and virtually invisible fiber installations using a consumer grade, low odor, nonhazardous, water based adhesive to bond optical fibers to walls and ceilings indoors. Water based adhesives are desirable since they are typically non-toxic, allow clean up with soap and water, and can be shipped worldwide without restriction. As the demand for InvisiLight® installations has spread, users have expressed a desire that the installation time be reduced even more by addressing the following concerns.

Currently, an installer must move and climb a ladder multiple times. First, he or she deposits an adhesive bead over successive elevated portions of the routing path by repositioning and climbing the ladder to reach the ceiling or molding at each portion of the path, while at the same time holding onto an adhesive dispensing gun. To deposit the adhesive bead, the installer squeezes the gun trigger one or more times which causes a plunger inside the syringe to urge the adhesive out of an applicator nozzle. Once the adhesive is deposited over the entire routing path, the installer repeats the first series of ladder movements, climbing the ladder again at each elevated portion of the path where the installer uses a finger to press the fiber into the adhesive bead. At many premises, however, large furniture (e.g., sofas and entertainment centers) is located directly beneath one or more elevated portions of the routing path, thus making it difficult for the installer to use the ladder safely at such locations.

FIG. 1 shows an extensible adhesive dispensing gun system 10 which is disclosed in U.S. patent application Ser. No. 15/790,317 filed Oct. 23, 2017, and assigned to the present applicant. The system 10 enables an installer to apply an adhesive bead along ceilings and crown moldings while standing on the floor at the premises. The system includes an adhesive dispensing gun 12, an outer extension tube 14, an inner rod 16 extending axially inside the extension tube with a plunger head 18 at a distal end of the rod, a base 20, a syringe adapter 22 at a distal end of the extension tube 14, and a syringe 24 having a piston 26 for dispensing an adhesive out of a syringe nozzle 30.

To apply the adhesive bead, the installer squeezes the trigger on the gun 12 one or more times to cause a plunger inside the gun to advance against the inner rod 16 which, in turn, urges the piston 26 inside the syringe 24 to dispense the adhesive out of the nozzle 30. The plunger head 18 at the end of the inner rod 16 applies uniform forward and outward pressure to a thin-walled, trailing end of the piston 26, helping it to seal against the inner wall of the syringe 24 and to ensure a reliable and consistent adhesive application.

Figure 2:
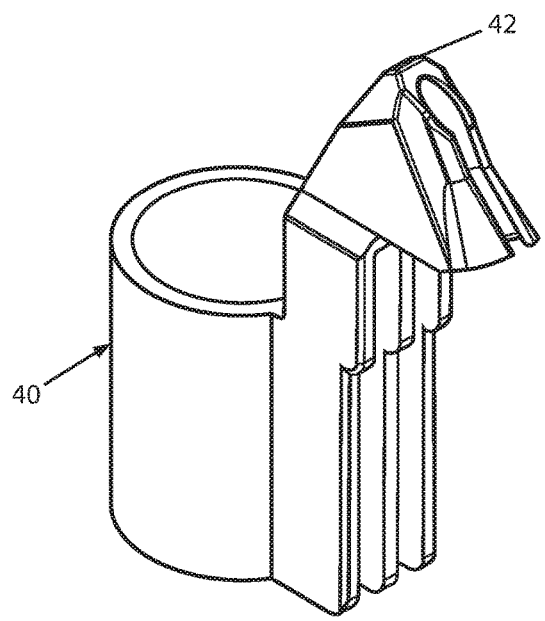
Figure 3:
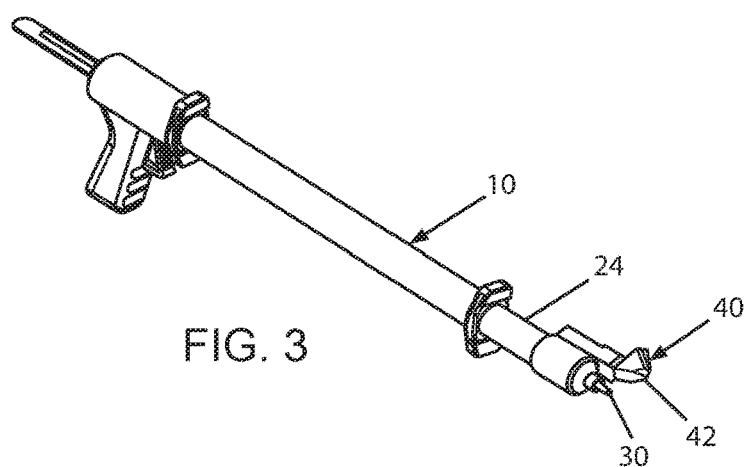

FIG. 2 shows a cord guide tool 40 as disclosed in U.S. patent application Ser. No. 15/837,537, filed Dec. 11, 2017, and also assigned to the present applicant. As seen in FIG. 3, when attached to a distal end of the syringe 24 in the dispensing gun system 10 in FIG. 1, the guide tool 40 enables an installer to embed a fiber neatly and precisely into an adhesive bead deposited at near a ceiling without a ladder. The guide tool 40 has a flat leading edge 42 sized so that when urged across a corner between adjacent walls, a wall and a ceiling, or a wall and a molding, the space defined between leading edge 42 and the corner is relatively small. When an adhesive bead is deposited along the corner and a fiber is oriented to pass between the leading edge 42 of the tool 40 and the corner in which the adhesive bead has been dispensed, the guide tool 40 will embed the fiber in the bead.

Pub. No. US 2017/0160508 (Jun. 8, 2017), also assigned to the present applicant and incorporated herein by reference, describes a tool for embedding an optical fiber in an adhesive bead deposited along a structural corner in a building room or hallway, without a ladder. The tool has a trough for receiving and containing a fiber, a guide channel at a downstream end of the trough that is arranged to retain the fiber, and a nose at a downstream end of the channel for embedding the fiber in the bead when an installer uses a pole to sweep the tool nose over and against the bead.

Inside and outside corner bend limiters are currently available from OFS Fitel, LLC as part of an InvisiLight® Supplemental Routing Kit, item #301079802. To facilitate attachment of the bend limiters at the corners of various structural surfaces (e.g., crown moldings, walls, and ceilings), the limiters are provided with thin pieces of double-sided adhesive tape with release liners. U.S. Pat. No. 9,720,200 (Aug. 1, 2017) also discloses a bend limiter in FIG. 2A of the patent. The limiter in the '200 patent has a guide path for receiving a communications cable, and one or more pairs of spaced tabs to avoid unintentional separation of the cable from within the guide path.

To facilitate even faster installations while minimizing ladder use, several problems need to be addressed. First, an extensible adhesive dispensing gun system like the system 10 in FIG. 1, which eliminates the need for a ladder during the adhesive application, is required. Second, one or more cord retaining devices are needed to retain a cord and position it close enough to a dispensed adhesive bead so that the cord can be embedded in the bead. The cord retaining device should also support the weight of the cord while the adhesive bead cures. Finally, a tool such as the cord guide tool 40 in FIG. 2 is required to urge the cord precisely and neatly into the adhesive bead without requiring the installer to use a ladder. Alternatively, before dispensing an adhesive bead along a desired routing path, the cord could be retained temporarily along the routing path with the aid of a cord retaining device. The adhesive bead could then be dispensed along the path, followed by embedding the cord into the bead.

SUMMARY OF THE INVENTION

According to the invention, a device for retaining an optical fiber or cord at a desired position along a defined installation route at a user premises, includes an elongated bend limiter having an open channel extending between opposite ends of the bend limiter. The channel is dimensioned and arranged to receive a given cord and to allow the cord to slide freely inside the channel.

An elongated retainer is constructed and arranged to overlie the bend limiter, and to close the open channel in the bend limiter when the retainer is secured to the bend limiter, thus confining the given cord confined inside the channel when the cord slides between the opposite ends of the bend limiter.

A latch is arranged to close the device by securing the retainer to the bend limiter, and the bend limiter is configured to conform in shape with one or more surfaces against which the bend limiter will be installed at the premises.

For a better understanding of the invention, reference is made to the following description taken in conjunction with the accompanying drawing and the appended claims.

BRIEF DESCRIPTION OF THE DRAWING FIGURES

Figure 4A:
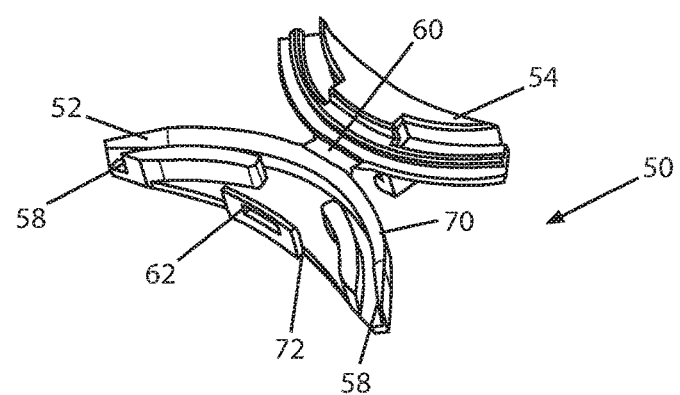
Figure 4B:
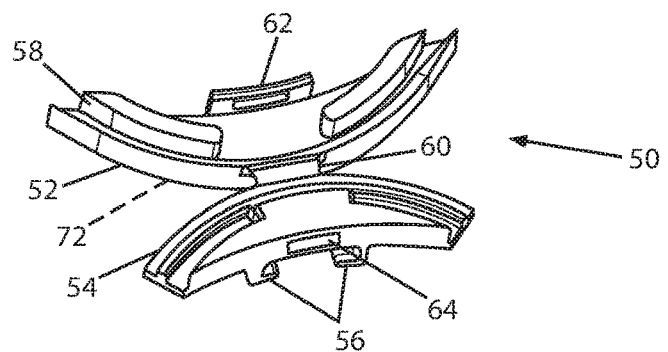
Figure 5:
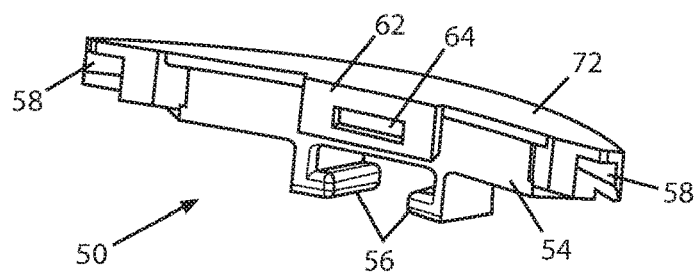
Figure 6:
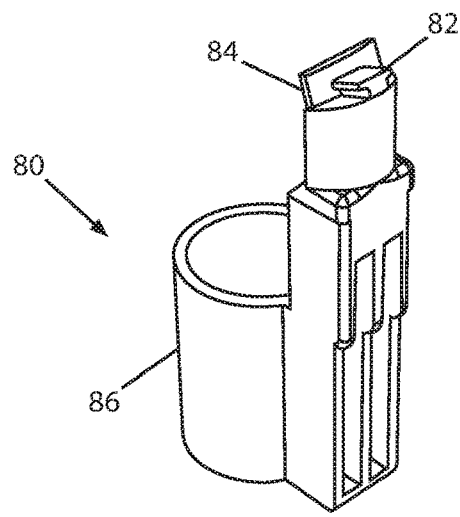
Figure 7:
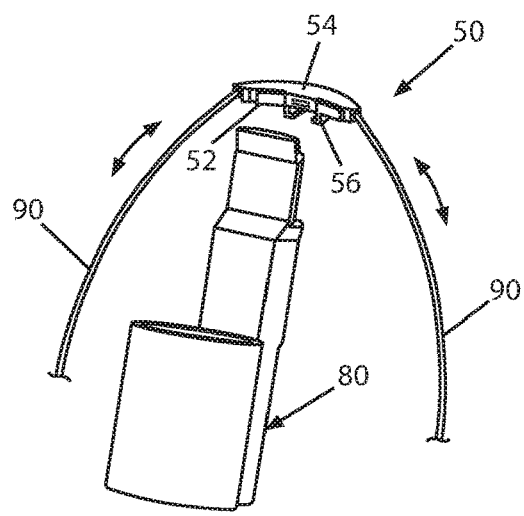
Figure 8:
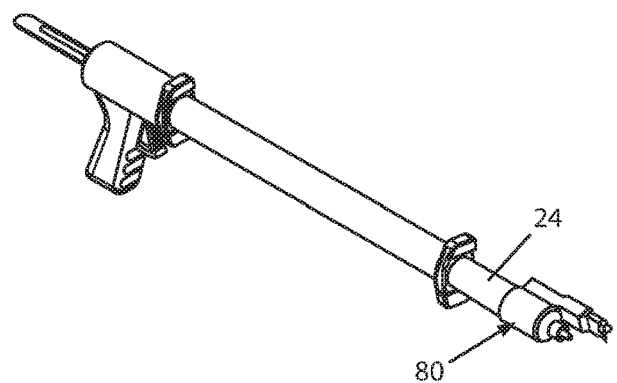
Figure 9A:
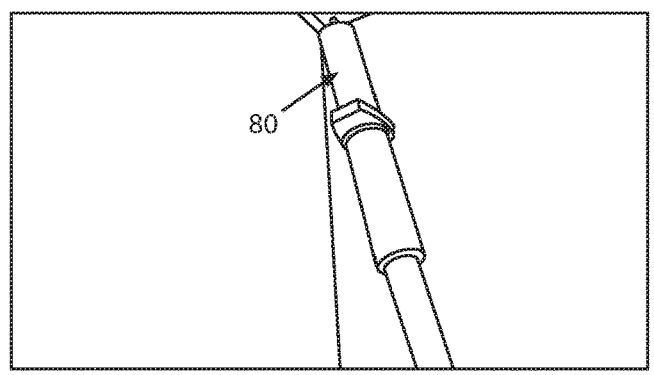
Figure 9B:
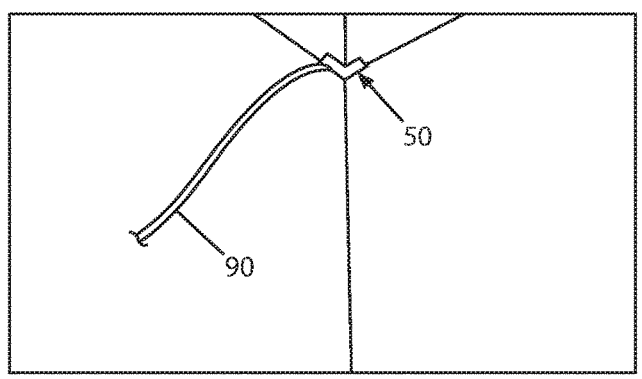
Figure 10:
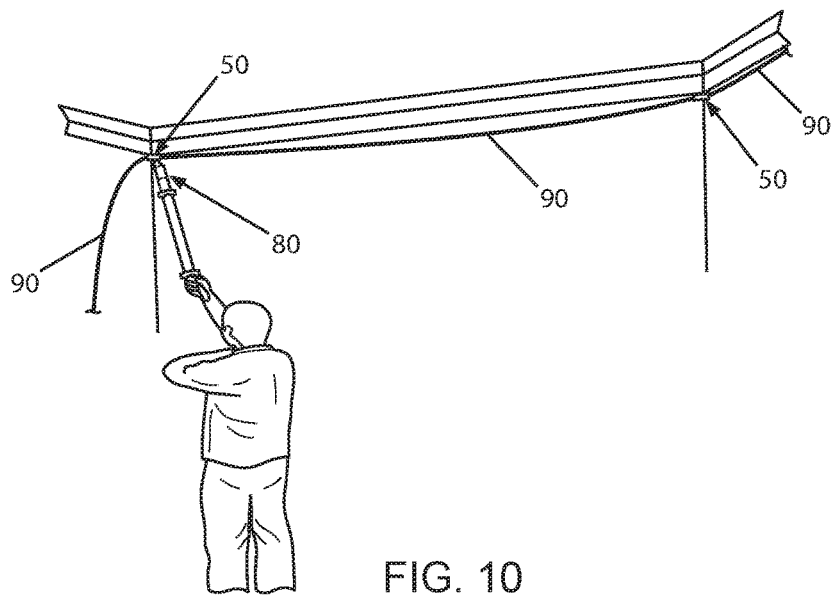
Figure 11A:
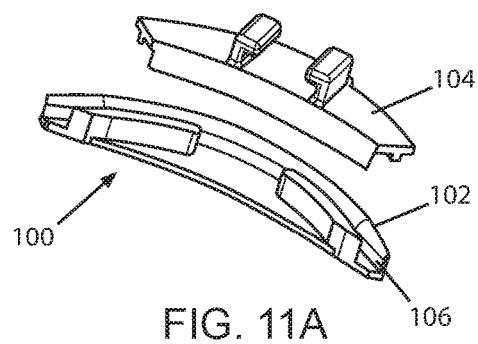
Figure 11B:
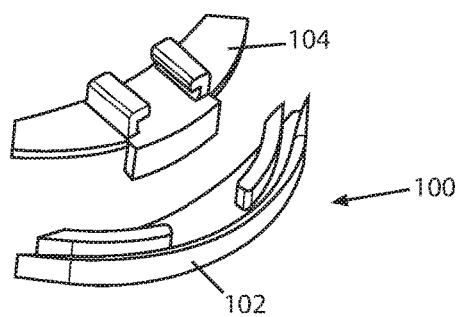
Figure 12:
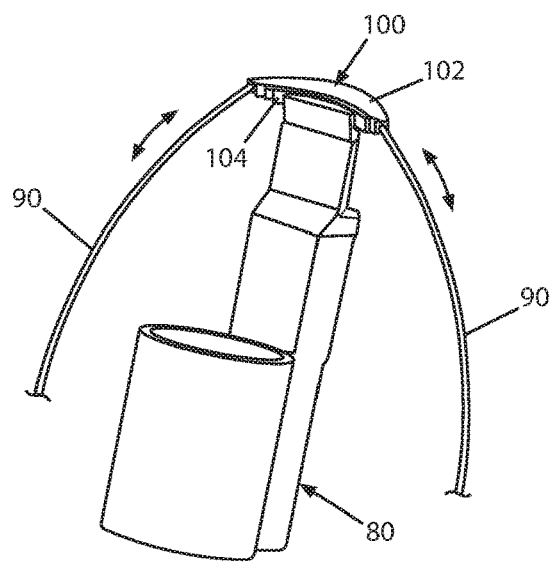
Figure 13A:
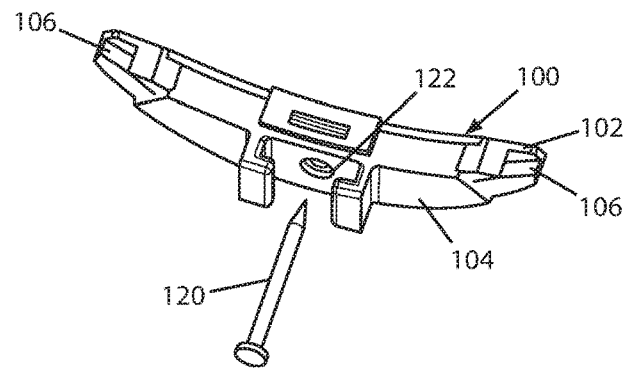
Figure 13B:
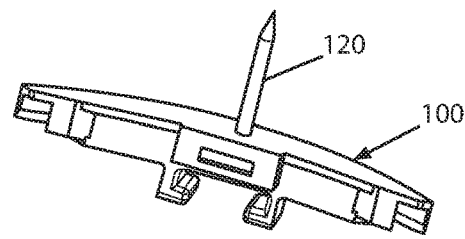
Figures 14A, 14B, 14C:
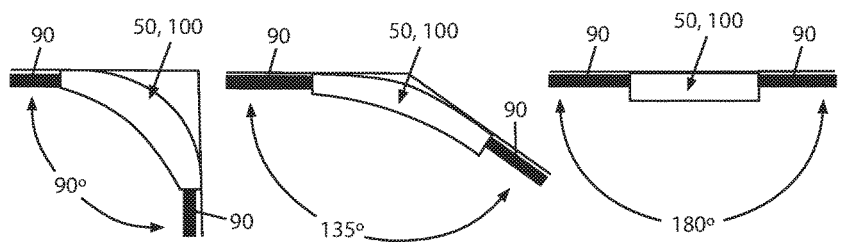
Figure 15:
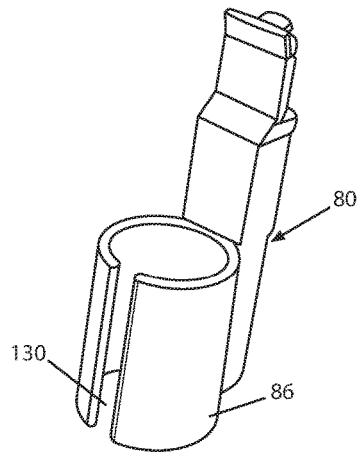
Figure 16:
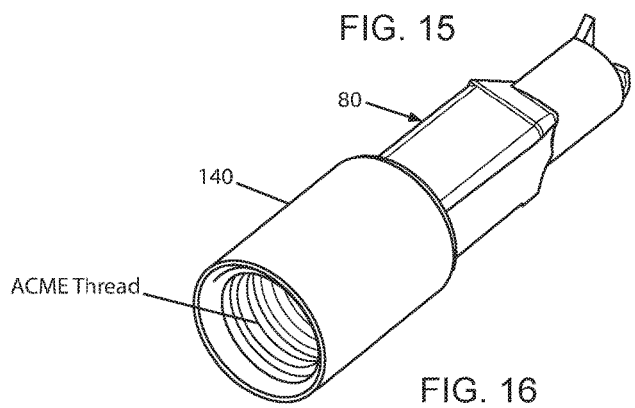

In the drawing:
FIG. 1 shows an extensible adhesive dispensing gun system;
FIG. 2 shows a cord guide tool;
FIG. 3 shows the cord guide tool in FIG. 2 when attached to the adhesive dispensing gun system in FIG. 1;

FIGS. 4A and 4B show an embodiment of a cord retaining device according to the invention;
FIG. 5 shows the inventive cord retaining device in a closed position;
FIG. 6 shows an installation tool for the cord retaining device;
FIG. 7 shows the installation tool in FIG. 6 when engaging the cord retaining device;
FIG. 8 shows the installation tool in FIG. 6 attached to the adhesive dispensing gun system in FIG. 1;
FIGS. 9A, 9B, and 10 show the installation tool in FIG. 6 being used to install the inventive cord retaining device in an inside corner of two walls near the ceiling at a user premises;
FIGS. 11A and 11B show another embodiment of a cord retaining device according to the invention;
FIG. 12 shows the cord retaining device in FIG. 11 attached to the installation tool in FIG. 6;
FIGS. 13A and 13B show a modification of the cord retaining device in FIG. 11;
FIGS. 14A, 14B, and 14C show how the inventive cord retaining devices in FIGS. 4A, 4B, and 11 can have different configurations to conform in shape with walls against which the devices will be installed at the user premises;
FIG. 15 shows a modification to an attachment collar on the installation tool in FIG. 6; and
FIG. 16 shows a cylindrical threaded boss in place of the attachment collar on the installation tool in FIG. 6.

DETAILED DESCRIPTION OF THE INVENTION

FIGS. 4A and 4B show one embodiment of a cord retaining device 50 according to the invention. The device allows optical fibers or cords to be installed at user premises with only minimal use of a ladder.

Cord retaining device 50 includes a bend limiter 52, and a retainer 54 having a tool attachment part 56. The bend limiter 52 has a generally elongated body, and a channel 58 is formed with an open top along the body of the bend limiter 52. The channel 58 is sized to contain a given cord, and to allow the cord to slide freely inside the channel between opposite ends of the bend limiter. The retainer 54 also has a generally elongated body that acts as a lid, wherein the retainer 54 closes the top of the channel 58 when the retainer is secured over the bend limiter as in FIG. 5.

In the embodiment of FIGS. 4A and 4B, the bend limiter 52 is joined to the retainer 54 by a living hinge 60. As shown, the hinge 60 is attached to the bend limiter 52 and to the retainer 54 at locations substantially midway along their confronting edges. The bend limiter 52 also includes a snap latch 62 formed and dimensioned to engage a chamfered boss 64 on the retainer 54 and thus secure the retainer to the bend limiter and close the top of the channel 58. As a result, a cord contained in the channel 58 is confined inside the channel when the latch 62 closes the device 50 as in FIG. 5, as the cord slides freely in and out the opposite ends of the bend limiter 52.

The device 50 may be produced by injection molding a material such as, e.g., clear polypropylene, polyethylene, or other equivalent and chemically resistant plastics. A thin, double-sided adhesive tape with a release backing is adhered on outside surfaces 70 and 72 of the bend limiter 52, to facilitate attachment of the retaining device 50 when closed to various structural surfaces, e.g., crown moldings, walls, and ceilings over which the cord will be routed at the premises.

FIG. 6 shows a tool 80 that can be used to install the cord retaining device 50 at a desired location along an elevated routing path at a user premises. The installation tool 80 has a key 82 formed to engage the attachment part 56 on the retainer 54 of the device 50. The tool 80 also has a stop 84 arranged to position the tool optimally relative to the device 50, and a cylindrical attachment collar 86 dimensioned and arranged to attach the tool 80 about a distal end of the syringe 24 on the adhesive dispensing gun system 10 in FIG. 1. See FIG. 8.

FIG. 7 shows the installation tool 80 about to engage the attachment part 56 on the retainer 54 of the cord retaining device 50. As depicted in FIG. 7, a given cord 90 is free to slide in either direction through the channel 58 in the bend limiter 52 after the retainer 54 is secured on the bend limiter. Accordingly, when the installation tool 80 is attached to the distal end of the syringe 24 as in FIG. 8, an installer can install the closed device 50 with the cord 90 retained therein, within an inside corner or at another elevated location along a desired installation route at the premises. See FIGS. 9A, 9B, and 10.

To install the cord 90 along the desired route using one or more of the inventive cord retaining devices 50, an installer would typically perform the following steps:

1. Using the adhesive dispensing gun system 10 in FIG. 1, dispense an adhesive bead along the desired route, except for approximately one inch on either side of each inside corner and/or other locations along the route where one or more cord retaining devices 50 are desired to be installed. Note that an installer's control over the movement of the syringe nozzle 30 may be improved or enhanced by providing a second handle 89 (see FIG. 1) in addition to the handle on the dispensing gun 12, and setting the handle 89 at a desired position along the outer extension tube 14.

2. Replace the syringe nozzle 30 with a syringe cap, and attach the installation tool 80 in FIG. 6 to a distal end of the syringe 24.

3. Using masking tape or equivalent means, establish an initial anchor point for the cord, typically at or near an entry point to the premises.

4. Remove the release liners from adhesive tape strips on the bottom and rear walls 70, 72 of the bend limiter 52 of the device 50.

5. With the retainer 54 at an open position, place the cord within the channel 58 in the bend limiter 52, making sure the direction of the bend is consistent with the desired route of the cord. Secure the retainer 54 to the bend limiter 52 to close the top of the channel 58, and ensure the cord is still free to slide in and out the ends of the bend limiter through the channel.

6. Attach the retainer 54 of the closed cord retaining device 50 to the key 82 atop the installation tool 80.

7. Use the installation tool 80 to install the cord retaining device 50 in an inside corner and/or other location along the cord installation route. Drape the cord as needed to facilitate the installation.

8. Once the cord retaining device 50 is installed at each location, carefully pull the cord in the direction it will be routed so as to remove slack. Also, gently remove slack where the cord is routed about outside corners, using, e.g., the cord guide tool 40 in FIG. 2 to position the cord as needed.

9. Use the cord-guide tool 40 to embed the cord into the adhesive bead dispensed in step 1, above.

10. Repeat steps 4 to 9, above, at each additional corner and/or other location where the device 50 is desired to be installed along the cord installation route.

Note that as an alternative, one or more cord retaining devices 50 and the cord 90 could be installed prior to the adhesive dispensing step 1. That is, step 1 may be performed after step 7. Also, the cord retaining device 50 can be used to route or turn cords in a vertical plane if needed at corners, wall-ceiling interfaces, and other locations. The installation tool 80 for the device 50 could then be modified by a skilled person if necessary, by reconfiguring the key 82 and the stop 84.

FIGS. 11A and 11B show another embodiment of a cord retaining device 100 according to the invention, including a bend limiter 102 having a cord retaining channel 106, and a separate retainer 104, both of which have generally elongated bodies similar to the bend limiter 52 and the retainer 54 of the device 50. Double-sided adhesive tape strips with release liners are also placed on the bottom, upper, and outside surfaces of the bend limiter 102.

To use the cord retaining device 100, an installer removes the release liners from the tape strips on the bend limiter 102, places the cord in the channel 106, and then secures the retainer 104 in place over the bend limiter 102 to confine the cord inside the channel 106. To route the cord, the installer can perform the installation steps listed above. FIG. 12 shows the installation tool 80 attached to the cord retaining device 100.

As shown in FIGS. 13A and 13B, and to help install the cord retaining device 100 when closed against a ceiling or wall surface that is textured, a tack 120 can be pressed into the ceiling or wall through an opening 122 formed through the bend limiter 102 and the retainer 104 of the device 100. The tack 120 would be inserted, for example, into the device 100 prior to attachment to the installation tool 80. The tack 120 could also be insert molded into the cord retaining device 100, with the head of the tack embedded in the molded plastic device. Tack 120 could be made of, e.g., steel or brass so as to penetrate walls and ceilings easily, even when a popcorn texture and several coats of paint are present.

The entrance and the exit directions of the channels 58 and 106 in the devices 50 and 100 as illustrated herein are substantially perpendicular or at 90 degrees relative to one another. As shown in FIGS. 14A to 14C, however, the devices 50, 100 can be made to have other, for example, 135 or 180 degree entrance/exit configurations so as to allow the devices to be used in rooms having walls that form one or more inside corners of 135 degrees, or in rooms where the cord is routed over relatively long straight spans.

Further, as shown in FIG. 15, the cylindrical collar 86 on the installation tool 80 can be formed with a longitudinal slot 130 to improve the gripping force of the attachment 86 on the adhesive dispensing syringe 24. If the slot 130 is provided, the inside diameter of the collar 86 could be modified in a known manner to optimize the gripping force. Moreover, the collar 86 could be replaced with a cylindrical boss 140 having an internal ACME thread, as shown in FIG. 16. This would allow the installation tool 80 to be threaded onto a distal end of a standard extension pole, instead of being attached to the syringe 24 of the adhesive dispensing system 10 as in FIG. 8.

While the foregoing represents preferred embodiments of the present invention, it will be understood by persons skilled in the art that various changes, modifications, and additions such as those mentioned above can be made, without departing from the spirit and scope of the invention. Accordingly, the invention includes all such changes, modifications, and additions as are within the bounds of the following claims.

We claim:

1. A cord retaining device for retaining an optical fiber or cord at a desired position along an elevated routing path at a user premises, the device comprising:
   an elongated bend limiter having an open channel that extends between opposite ends of the bend limiter, wherein the channel is dimensioned and arranged to receive a given cord and to allow the cord to slide freely between the ends of the channel;
   an elongated retainer constructed and arranged to overlie the bend limiter, and to close the open channel in the bend limiter when the retainer is secured to the bend limiter so that the given cord is confined inside the channel while remaining free to slide between the opposite ends of the bend limiter;
   a latch arranged to close the cord retaining device by securing the retainer to the bend limiter;
   the bend limiter and the retainer are configured to conform in shape with one or more surfaces against which the device will be installed at the premises; and
   a tool attachment part fixed on the device, wherein the tool attachment part is formed and dimensioned for receiving a key of an outside installation tool for installing the device at a desired location along the elevated routing path at the premises when the device is closed with the given cord disposed in the channel in the bend limiter of the device.

2. A cord retaining device according to claim 1, including a hinge arranged to join the bend limiter to the retainer for swinging movement between an open and a closed position of the device.

3. A cord retaining device according to claim 1, wherein the bend limiter and the retainer are configured to conform in shape to an inside corner of two walls inside the premises.

4. A cord retaining device according to claim 3, wherein the inside corner is approximately 90 degrees.

5. A cord retaining device according to claim 1, including one or more adhesive strips disposed on outside surfaces of the device for adhering the device against a wall or other surface on which the device is installed at the premises.

6. A cord retaining device according to claim 1, including a tack for fixing the device against a wall or other surface on which the device is installed at the premises.

7. A cord retaining device according to claim 1, wherein the tool attachment part is fixed on the retainer of the device.

8. A system for installing an optical fiber or cord along an elevated routing path at a user premises, comprising
   a cord retaining device according to claim 1; and
   an installation tool for installing the cord retaining device at a desired location along the elevated routing path at the premises when the device is closed with the cord disposed in the channel in the bend limiter of the device, wherein the installation tool has the key that is received in the tool attachment part fixed on the device.

9. A cord installation system according claim 8, wherein the installation tool includes a collar dimensioned and arranged to attach the tool to a distal end of an adhesive applicator syringe.

10. A cord installation system according to claim 9, wherein the collar has a longitudinal slot.

11. A cord installation system according to claim 8, wherein the installation tool includes a cylindrical boss constructed and arranged to attach the tool to a distal end of an extension pole.

12. A cord installation system according to claim 8, including an extensible adhesive dispensing gun system comprising:
   a dispensing gun having a first handle;
   an adhesive syringe having a nozzle;
   an extension tube one end of which is attached to the dispensing gun and the other end of which is attached to the adhesive syringe; and
   a second handle constructed and arranged to be set at a desired position along the extension tube for enhancing an installer's control over movement of the nozzle on the adhesive syringe.

13. A cord installation system according to claim 8, wherein the tool attachment part is fixed on the retainer of the cord retaining device.

* * * * *